Patented Apr. 18, 1944

2,346,844

UNITED STATES PATENT OFFICE 2,346,844

PROCESS OF TREATING MILK

Maurice E. Hull, Columbus, Ohio, assignor to M & R Dietetic Laboratories, Inc., a corporation of Ohio No Drawing. Application August 14, 1940, Serial No. 352,523

11 Claims. (Cl. 99—54)

This invention relates to a method for the treatment of milk and milk products to effect an alteration or reduction of the calcium and phosphate ion proportions of the treated milk products and to secure other improvements therein from a dietary standpoint and to a method of regenerating exchange material which has been inactivated by contact with a milk product or the like. It is an improvement upon the subject matter of invention disclosed in Patent No. 2,102,642 to Herbert E. Otting, Edwin H. Browne and myself.

In accordance with the above-mentioned patent, the partial removal of calcium and phosphate ions from acidified liquid milk products is effected by contacting the acidified milk products with an exchange material which has been activated or reactivated by a method comprising successively treating spent exchange material carrying calcium and phosphate ions with an aqueous solution of an alkali containing either a water-soluble silicate or a water-soluble aluminate, with an acidified alkali metal salt solution, and with a second aqueous solution of an alkali, containing either a water-soluble silicate or aluminate. The first alkali treatment or wash is used to remove milk fat and protein as well as some phosphorus from the surfaces of the spent exchange material.

It has been found that the use of this first alkali treatment or wash is objectionable because the alkali appears to combine with the calcium ions in the spent exchange material to form a peculiar type of alkali stable calcium complex which must be removed before proper regeneration of the spent exchange material can be affected. To effect break-down of this complex and removal of the calcium ions, it has been necessary to resort to the use of substantial amounts of salt and of acid in the salt regeneration step of the process, considerably in excess of that required merely to effect regeneration.

In accordance with my present invention, I have found that by substituting for the first alkali wash, in the process described above, a wash comprising a solution of a wetting agent, I am enabled to obtain a better and more effective removal of milk fat, protein and phosphorus than heretofore, as well as avoiding, to a very large extent, the formation of the undesirable calcium complex, thereby making possible an improved regeneration of the spent exchange material and a consequent improved calcium and phosphate ion removal from the milk product to be treated. By operating in accordance with the present invention, I am enabled to remove substantially all of the calcium from the spent exchange material with but about one-half as much acid, and even less, and about 30% to about 40% less of the salt solution that was required heretofore. In addition, I am enabled to speed up considerably the complete milk treating process since the need for careful washing of the spent exchange material, prior to and after the first alkali wash, as heretofore, is largely eliminated.

The wetting agent used in accordance with my invention may be, suitably, one of the well-known types which is a good detergent and is capable of emulsifying milk fat and protein readily. It is preferred that the wetting agent be free from alkali, silica and phosphates and be substantially unaffected by hard water. A desirable wetting agent in accordance with my invention may be, suitably, a sulfated, relatively high molecular weight fatty alcohol, for example, sodium lauryl sulfate, which is sold by Procter & Gamble Co. under the trade-mark "Dreft." Other wetting agents which may be used in accordance with my invention will be fully described hereinafter.

By the process of the present invention, I am enabled to secure the desired calcium and phosphate ion removal, to maintain the desired balance of the sodium and potassium ions in the treated milk, and to maintain the structural characteristics and exchange efficiencies of the exchange materials employed, more readily and effectively than heretofore.

In the following description of the present invention, the active materials capable of removing calcium and phosphate ions from liquid milk products are referred to as base exchange materials. These materials may be, suitably, natural or artificial zeolitic materials such as zeolites or glauconites which are sold in the trade and commonly known as "Permutit," "Refinite," "Crystalite" and the like as set forth more fully in the above-mentioned patent, or organic base exchange materials derived from synthetic resins, or the like.

As the first use of a fresh exchange material is likely to impart an undesirable flavor to the milk to be treated, good practice dictates that a preliminary run through the active exchange material be made with a milk product other than the milk to be treated, for example, skim milk. The exchange material is then regenerated or revivified to activate it for use for the treatment of the liquid milk or other liquid milk products. Similar regeneration and activation of the exchange material is effected after each use.

As a preliminary step to the regenerating process of my invention, the spent exchange material may be washed with water, preferably up-flow, to remove, in part, the milk fat, proteins and other organic and soluble matter left in it after use; however, this preliminary water washing step is not essential. If utilized, the water employed for this wash should be warmed slightly as described in the above-mentioned patent. Following this preliminary wash, the water is drained from the spent exchange material. Whether cleaned with the preliminary water wash, or immediately after the first run of the milk product through the base exchange material, the spent exchange material is ready for the regenerating treatment, the first step of which is a wetting agent wash.

A wetting agent wash in accordance with my invention may be made up by dissolving a small amount of a suitable wetting agent in water. Thus, depending upon the particular wetting agent employed, the concentration of the wetting agent in the solution may vary from a lower limit of about 0.005% up to about 0.10%. Larger amounts of the wetting agent may be employed, but usually such larger amounts are not essential. In the case of Dreft, for example, I have obtained satisfactory results with a concentration of about 0.05%. If desired, borax may be used along with the wetting agent in the wetting agent wash. When the wetting agent-borax mixture is used, the quantity of wetting agent employed may be reduced considerably below that required when the wetting agent is used alone, say, to about two-thirds to about one-half, depending upon the particular wetting agent. The quantity of borax used in admixture with the wetting agent in accordance with my invention may also vary rather widely. Thus, the borax may be used in concentrations varying from about 0.1% to about 1.0%, depending upon the particular wetting agent employed. In the case of a mixture of Dreft and borax, for example, I have obtained satisfactory results with a concentration of Dreft in the order of about 0.025% and a concentration of borax in the order of about 0.90%. About 20 gallons of this solution is sufficient for use with each cubic foot of spent exchange material (about 45 lbs. dry weight). It is to be understood that the amount of solution employed should be sufficient to keep the spent exchange material to be treated covered during the washing operation.

In use, the wetting agent wash is recirculated through the spent exchange material in the filter for a sufficient period of time, about 10 minutes, and with occasional stirring. Preferably, the wetting agent solution is warmed before use to about 90° F. to 100° F.

In tests conducted by me I have found that this wetting agent wash removes substantially all of the milk fat and protein from the spent exchange material. In comparative runs, I have found that my wetting agent wash removes in the order of about two to three times as much inorganic phosphorus from the spent exchange material and even more, as is capable of being removed by the first alkali wash of the process of the above-mentioned patent.

When the wash is completed, the wetting agent solution is withdrawn from the filter, and the exchange material may be washed with warm water, if desired. In my preferred process, I follow the wetting agent wash with a warm water wash to remove substantially all of the wetting agent from the wetting agent washed exchange material. Following this warm water wash, the spent exchange material is ready for the salt regeneration step of my process.

As in the above-mentioned patent, the salt solution employed may be the usual alkali metal salt or salts used in revivifying spent exchange materials, as for instance the alkali metal halides or chlorides. I prefer to use both sodium and potassium salts in the salt solution, in varying amounts, controlled to secure the desired relationship of the salts in the treated milk. The relative proportions of the two salts in the revivifying solution may be varied somewhat, particularly, if it is found that the desired balance of sodium and potassium salts in the liquid milk product undergoing treatment is being disturbed; and in the event that a decrease in either the sodium or potassium content of the product is taking place, a corresponding increase in the relative proportion of the salt of the same alkali metal may be made in the solution employed for revivification.

In my preferred practice, I use a salt mixture made up of equal parts of sodium chloride and potassium chloride, thereby enabling me to obtain a sodium-potassium ratio in the treated milk which closely approximates the sodium-potassium ratio in the untreated milk. The concentration of salts in solution may vary from about 3½% to about 8%. Larger amounts of the salts may be used, if desired, but for most purposes the concentrations of salts stated is sufficient. I have found that about 15 to about 22 gallons, usually about 20 gallons, of a 5% solution of the mixed salts will adequately restore to each cubic foot of spent exchange material the capacity of removing calcium ions and of maintaining the desired alkali salts relation in milk treated therewith. Since the amount of solution used is dependent, in part, upon the depth of the bed of exchange material treated, in some instances, a lesser amount of salt solution may be used to accomplish the same results.

In addition, I utilize an acid along with the salts in solution to assist the salts in removing all of the calcium ions from the spent exchange material. The acid used may be, suitably, any innocuous acid such as acetic acid, buffered with sodium acetate or other suitable alkali metal salt of a weak acid. In general, I have found that about one-half pound of the acid and about an equal amount of the buffering agent is sufficient to be used in the salt solution for each cubic foot of base exchange material to be treated. These amounts are substantially below those required in the salt solution when the spent exchange material is treated with the first alkali wash as in the above-mentioned patent. In a salt solution such as described above I have obtained satisfactory results using about 200 cc. of 80% acetic acid and about ½ lb. of sodium acetate (60% grade) for each 20 gallons of the hereinabove described salt solution.

From comparative runs I have found that the hereinabove described salt solution will remove greater proportions, by about 33⅓% up to about 50%, and even more, of calcium, and by about 200% to about 600%, and even more, of phosphorus as phosphate from the wetting agent washed exchange material than is capable of being removed from the alkali washed exchange material by the larger amount of acidified salt solution, having the higher salts and acid concentrations, in the procedure of the above-mentioned patent.

The runs above referred to were made by percolating the acidified salt solutions downwards through identical beds of spent exchange material until the effluents were substantially free from calcium ions, as indicated by no more than a faint cloudiness when a small sample was tested with ammonium oxalate.

When both sodium chloride and potassium chloride are used in the salt regeneration step of my process, it is desirable to add the sodium chloride and all of the acid and buffer salt to one-half of the water used to make up the salt solution as described above, this half being percolated through the bed of exchange material first and followed by the remainder containing the potassium chloride. After all of the calcium ions have been removed, the bed of exchange material is then washed with about 7 to 10 gallons of water per cubic foot of exchange material as in the above-mentioned patent. It is preferred that this wash water be of practically zero hardness or be zeolite treated water, since the life of the exchange material is thereby prolonged.

The acid in the salt solution removes some alkali from the exchange material and this must now be restored. To accomplish this, I utilize a modified alkali solution, of an alkalinity such as to show a slight residual alkalinity at the end of the washing operation, which improves the effectiveness of the exchange material for removal of phosphate ions from the milk product to be treated. Thus, I may employ an aqueous solution of a caustic alkali such as sodium hydroxide in which is preferably incorporated a water-soluble aluminate, particularly when the exchange material is zeolitic or an alumino-silicate. This wash serves additionally to restore alumina lost by the exchange material during revivification, thereby improving the effectiveness of the exchange material. The solution may contain a mixture of the alkali and the aluminate in a concentration varying from about 0.5% to about 3.5%. The proportion of aluminate in respect of the alkali may vary as desired from about equal parts to about one part of caustic to about two parts of aluminate, all by weight. In general, about 1 lb. of a mixture of alkali and aluminate is sufficient to treat 1 cubic foot of base exchange material. If desired, the sodium aluminate may be used in the form of a solution having a 32% concentration and known in the trade as "Nalco #2". This alkali wash is circulated through the salt regenerated exchange material in the same manner and at about the same temperature as the wetting agent wash. The solution should show a slight residual alkalinity, say N/30 to N/50, after washing is completed.

Following the alkali wash, the now revivified exchange material is washed with water, as before, and is cooled, suitably by the use of cool wash water. It is now ready to be contacted with the liquid milk product to be treated.

The milk to be treated is first cooled, say, to about 40° to 60° F. and may then be acidified if desired, by a hydroxylated food acid, preferably citric acid. Care should be exercised in introducing the acid into the milk in order to prevent local curdling. The action of the exchange material in removing phosphate ions reduces the acidity of the milk and acidification is effected prior to treatment with the exchange material both to restore the original acidity of the milk and to facilitate the removal of the calcium and phosphate ions. Sufficient hydroxylated food acid may therefore be added to the milk to give an acidity of about 0.25% to about 0.35% (calculated as lactic acid). The acidified milk is maintained at substantially the same temperature at which the acid, when used, is added thereto and is subjected to treatment with the activated exchange material in accordance with my invention as described in the above-named patent. I have found that about 1 cubic foot of exchange material, activated in accordance with my invention, will more effectively remove the calcium and phosphate ions from milk or milk products than heretofore. In addition, the exchange material maintains the desired alkali metal salt relationship in the treated milk.

The milk treated as above described will not form a curd with rennin even when employing 10 drops of concentrated rennin extract to 10 cc. of treated milk product. It likewise will not form a curd with pepsin.

After the exchange material has been used for some time, its effectiveness in removing calcium and phosphate ions becomes impaired due to a loss of silica and a consequent unbalancing of the desired $SiO_2$-$Al_2O_3$ ratio. I have found that the effectiveness of the exchange material can be restored by an alkali-silicate wash which restores to the exchange material the desired $SiO_2$-$Al_2O_3$ ratio, hence making it suitable for use for protracted periods. This wash comprises a solution of an alkali modified by a water-soluble silicate such as sodium metasilicate. Except for the use of a silicate instead of an aluminate, this modified wash is in all other respects, proportions, concentration, etc., substantially the same as the alkali wash containing an aluminate, as described above, and is used in exactly the same way, immediately following the acidified salt solution step of my process. Its use, however, is only occasional, say, one to four times a month. This periodic alkali-silicate wash not only maintains the exchange capacity of the exchange material, but appears to improve it.

Other wetting agents may be used in accordance with my invention. The wetting agents available are those having both lipophyllic and hydrophyllic groups and are rather completely classified and described in Industrial and Engineering Chemisty, vol. 31, No. 1, January, 1939, pp. 66–69. Of these, I have obtained particularly satisfactory results with the esters of the sodium sulfo-succinates, for example, the dioctyl ester of sodium sulfo-succinate sold under the trade-mark Aerosol OT Dry; with the alkyl aryl sulfonates sold under the trade-marks Aerosol OS and Nacconol NR; with the alkyl sulfates sold under the trade-marks Orvus WA, Duponol WA & ES; with the sulfonated ether sold under the trade-mark Triton 720; and with the sulfonated hydrocarbon sold under the trade-mark MP 189. I have also obtained satisfactory results with the so-called "hydrophillic lipins" which are formed by esterifying one or more, but not all of the hydroxyl radicals of an organic water-soluble polyhydroxy substance with a high molecular weight fatty acid or derivative thereof having at least six carbon atoms and, preferably twelve to eighteen carbon atoms in the chain.

Examples of other wetting agents which may be used in accordance with my invention are the alkylolamine salts of the higher saturated and unsaturated aliphatic acids having eight or more carbon atoms in the chain and of the sulfonic acid derivatives of these acids, for example, diethanolamine oleate, triethanolamine sulfo-ricinoleate, and the like, as well as the compounds formed by completely esterifying a dihydric alcohol such as ethylene glycol with a higher fatty acid having a carbon content greater than 5, such as stearic acid, myristic, lauric acid, etc.

The condition of the active exchange material, as determined by the revivifying and regenerating treatment above described, is closely related to the effects secured on treatment of the liquid milk product with the active exchange material. Thus, by operating in accordance with the present invention, I am enabled to secure the desired removal of calcium and phosphate ions in a single passage of the liquid milk product through a bed or contact mass of the exchange material. In addition, I am enabled to control the character of the constituents retained in the milk, preserving a better balance of the sodium and potassium salts than heretofore, and, in general, secure a more dependable operation and an improved treated product.

The liquid milk product to be treated with the active exchange material in accordance with my invention may be, suitably, whole milk, skim milk, or other liquid milk products such as buttermilk, whey, or the like. It will be apparent that the present invention may be employed in reducing the calcium and phosphate content of aqueous solutions containing calcium and phosphate ions by contacting them with reactivated exchange material as described above.

Although the present invention has been described in connection with specific details of various operations in which it is carried out, and in connection with specific proportions, it is to be understood that it is not limited thereto, except in so far as included in the accompanying claims.

It is to be understood that the expression "wetting agent," as used herein and in the claims, contemplates those wetting agents which are classed as "non-cationic" and which are good detergents and which are capable of emulsifying milk fat and protein readily.

I claim:

1. The method of effecting the partial removal of calcium and phosphate ions from acidified liquid milk products by contact with a reactivated spent exchange material which comprises, successively treating the spent exchange material carrying calcium and phosphate ions with an aqueous solution of a wetting agent, with an acidified aqueous solution of an alkali metal salt and with an aqueous solution of an alkali and subsequently contacting the activated material with the acidified milk product.

2. The method of effecting the partial removal of calcium and phosphate ions from acidified liquid milk products by contact with a reactivated spent exchange material which comprises, successively treating the spent exchange material carrying calcium and phosphate ions with an aqueous solution of a wetting agent and borax, with an acidified aqueous alkali metal salt solution and with an aqueous solution of an alkali containing a water-soluble aluminate, and subsequently contacting the activated material with the acidified milk product.

3. In the method of regenerating spent exchange material which has been inactivated by contact with a milk product, the step comprising treating exchange material carrying calcium and phosphate ions with an aqueous solution of a non-cationic wetting agent.

4. In the method of regenerating spent exchange material which has been inactivated by contact with a milk product, the steps comprising treating exchange material carrying calcium and phosphate ions with an aqueous solution of a non-cationic wetting agent, with an aqueous solution of an alkali containing a water-soluble aluminate and with an intervening alkali metal salt solution.

5. In the method of regenerating spent exchange material which has been inactivated by contact with a milk product and which therefore carries calcium and phosphate ions, the steps comprising treating the said inactivated exchange material initially with an aqueous solution of a non-cationic wetting agent and then with an alkali metal salt solution.

6. In the method of regenerating spent exchange material which has been inactivated by contact with a milk product and which therefore carries calcium and phosphate ions, the steps comprising treating the said inactivated exchange material successively with an aqueous solution of a non-cationic wetting agent with an alkali metal salt solution and with a solution of a water-soluble aluminate.

7. In the method of regenerating spent exchange material which has been inactivated by contact with a milk product and which therefore carries calcium and phosphate ions, the steps comprising treating the said inactivated exchange material successively with an aqueous solution of a non-cationic wetting agent, with an alkali metal salt solution and with a solution of an alkali containing a water-soluble aluminate.

8. In the method of regenerating spent exchange material which has been inactivated by contact with a milk product and which therefore carries calcium and phosphate ions, the steps comprising treating the said inactivated exchange material successively with an aqueous solution of a non-cationic wetting agent, with an acidified alkali metal salt solution and with a solution of an alkali containing a water-soluble aluminate.

9. In the method of regenerating spent exchange material which has been inactivated by contact with a milk product and which therefore carries calcium and phosphate ions, the steps comprising treating the said inactivated exchange material successively with an aqueous solution of a non-cationic wetting agent, with an acidified solution of sodium and potassium chloride and with a solution of an alkali containing a water-soluble aluminate.

10. In the method of regenerating spent exchange material which has been inactivated by contact with a milk product and which therefore carries calcium and phosphate ions, the steps comprising treating the said inactivated exchange material successively with an aqueous solution of a non-cationic wetting agent, with an acidified alkali metal salt solution and with an aqueous solution of an alkali.

11. In the method of regenerating spent exchange material which has been inactivated by contact with a milk product and which therefore carries calcium and phosphate ions, the steps comprising treating the said inactivated exchange material successively with an aqueous solution of a non-cationic wetting agent and borax, with an acidified alkali metal salt solution and with an aqueous solution of an alkali.

MAURICE E. HULL.